(12) United States Patent
Irwin et al.

(10) Patent No.: US 6,944,473 B2
(45) Date of Patent: Sep. 13, 2005

(54) METHOD FOR RADIO ACCESS BEARER RECONFIGURATION IN A COMMUNICATIONS SYSTEM

(75) Inventors: Sania Choudhury Irwin, Glen Ellyn, IL (US); Nectar Andrew Kirkiris, Des Plaines, IL (US); George John Horwath, Norridge, IL (US)

(73) Assignee: Motorola, Inc, Schaumburg, IL (US)

( * ) Notice: Subject to any disclaimer, the term of this patent is extended or adjusted under 35 U.S.C. 154(b) by 749 days.

(21) Appl. No.: 09/892,222

(22) Filed: Jun. 25, 2001

(65) Prior Publication Data

US 2001/0055971 A1 Dec. 27, 2001

Related U.S. Application Data

(60) Provisional application No. 60/214,337, filed on Jun. 27, 2000.

(51) Int. Cl.[7] .................................................. H04M 1/00
(52) U.S. Cl. .............................. 455/550.1; 455/452.2; 455/450
(58) Field of Search ............................. 455/452.2, 561, 455/450, 426.1, 509, 453, 550

(56) References Cited

U.S. PATENT DOCUMENTS 6,668,175 B1 * 12/2003 Almgren et al. ............ 455/522
6,728,365 B1 * 4/2004 Li et al. ...................... 379/329
2001/0027490 A1 * 10/2001 Fodor et al.
2001/0054103 A1 * 12/2001 Chen
2002/0128017 A1 * 9/2002 Virtanen

FOREIGN PATENT DOCUMENTS

FI    WO 01/52571    * 7/2001    ............ H04Q/7/22

* cited by examiner

*Primary Examiner*—William J. Deane, Jr.
(74) *Attorney, Agent, or Firm*—Lalita W. Pace

(57) ABSTRACT

A method for Radio Network Controller (RNC) initiated Radio Access Bearer (RAB) negotiation or renegotiation/reconfiguration in a communication system that includes a core network and user equipment coupled to an RNC in a Universal Terrestrial Radio Access Network. When the core network establishes a service (e.g. voice call, web surfing session) with the user equipment, a RAB is set up for that service. The RAB includes certain parameters that effect the quality of the service. As the RNC monitors radio conditions, it may determine that one or more of the RAB parameters need to be modified. The RNC will initiate a RAB renegotiation/reconfiguration procedure by sending a RAB Modification Request Message to the CN specifying that a modification to the RAB is needed and the manner is which the modification should be affected. The CN may send a RAB Assignment Request Message informing the RNC whether the modification is acceptable.

7 Claims, 1 Drawing Sheet

—PRIOR ART—

METHOD FOR RADIO ACCESS BEARER RECONFIGURATION IN A COMMUNICATIONS SYSTEM

This application claims benefit of Prov. application 60/214,337 filed on Jun. 27, 2000.

FIELD OF THE INVENTION

The present invention relates generally to the field of wideband code division multiple access (W-CDMA) systems, and more particularly, to a method for performing radio access bearer renegotiation/reconfiguration.

BACKGROUND OF THE INVENTION

Quality of service (QoS) is an important consideration in wireless communication systems. Different types of service require different levels of quality. For example, a mobile telephone user that is engaged in a voice call with a network will likely require a higher quality connection (in terms of delay) than a user that is web surfing on his or her mobile telephone. Likewise, a user engaged in a web surfing session will likely require a better bit error ratio than a user engaged in a voice call. In accordance with existing $3^{rd}$ Generation Partnership Project (3GPP) standards, when a user equipment (UE), such as a mobile telephone, requests service from the core network (CN), a UMTS bearer service and underlying radio access bearer (RAB) service is set up for the requested service. This protocol is described in sections 6.1, 6.1.1, 6.1.2 of 3GPP TS 23.107 v4.0.0 (2000-12). Presently, the RAB includes nineteen (19) parameters for the service such as traffic class, maximum bit rate, and guaranteed bit rate, to name a few. The parameters characterize the required QoS for the requested service.

The RAB parameters are defined in section 9.2.1.3 of 3GPP TS 25.413 v4.0.0 (2001-03). The traffic class is defined as the type of application for which the Radio Access Bearer service is optimized. The maximum bit rate is defined as the maximum number of bits delivered by the Universal Terrestrial Radio Access Network (UTRAN) and to the UTRAN at a Service Access Point (SAP) within a period of time, divided by the duration of the period. The guaranteed bit rate is defined as the guaranteed number of bits delivered at a SAP within a period of time (provided that there is data to deliver), divided by the duration of the period. In accordance with sections 8.2 and 9.1.3 of TS 25.413, a RAB Assignment Request message with specified RAB parameter values is sent from the CN to a Radio Network Controller (RNC) in the UTRAN to inform the RNC of the QoS expected by the CN for a RAB. If any of the RAB parameters need to be changed, RAB negotiation or renegotiation/reconfiguration is performed. RAB negotiation refers to the exchange that occurs at the establishment of a RAB before settling on RAB parameter values. RAB renegotiation/reconfiguration refers to the exchange that occurs after the establishment of a RAB to request change of some or all previously agreed upon RAB parameter values.

In 3GPP Release 1999 standards, such as TS 24.008, v3.7.0 (2001-03), section 6.1.3.3 on PDP context modification procedure, QoS renegotiation for a service can be initiated by the CN and the UE. This does not allow efficient management of radio resources, because although the RNC actually manages the radio resources, it is not allowed to initiate QoS renegotiation through RAB renegotiation/reconfiguration to account for changed radio conditions. Failure to perform RNC initiated RAB renegotiation/reconfiguration can result in radio network overload, dropped calls and degradation of the quality of remaining calls. For example, if the RAB for a call initially specifies a maximum bit rate of 16 kbps, the RNC may need to lower the maximum bit rate to 12 kbps due to changed radio conditions. Currently, the RNC is unable to initiate renegotiation/reconfiguration of the RAB to effect this change which could result in a dropped call. Thus, there is a need for a method of RNC initiated RAB renegotiation/reconfiguration to decrease the occurrence of radio network overload, dropped calls and degradation of call quality.

DETAILED DESCRIPTION OF THE DRAWINGS

Figure 1:
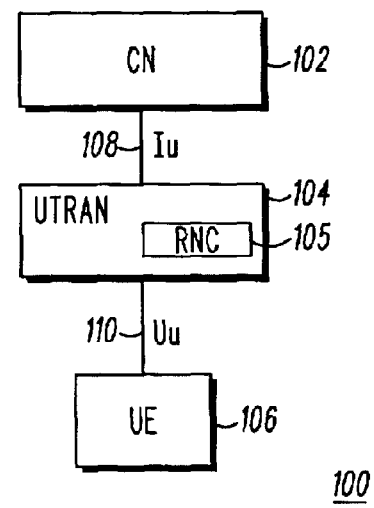
FIG. 1 is a block diagram showing the architecture of a UMTS system that can be used to implement the preferred embodiment of the present invention.

The present invention generally provides a method for an RNC initiated RAB renegotiation/reconfiguration. A new message (RAB Modify Request message) and modifications to old messages (RAB Assignment Request message, RAB Assignment Response message) are exchanged between the RNC and the CN in order to implement the method. In the preferred embodiment, the method is implemented in a UMTS system, however the method can also be implemented in any wideband code division multiple access (W-CDMA), code division multiple access (CDMA), Enhanced Data for GSM Evolution (EDGE) or General Packet Radio Service (GPRS) or Global System for Mobile Communication (GSM) wireless systems that require renegotiation/reconfiguration of RABs. Referring to FIG. 1, a simplified UMTS architecture 100 that can be used to implement the present invention is shown. As known in the art, the UMTS architecture 100 includes a CN 102 coupled to a UTRAN 104 through an Iu interface 108. The UTRAN 104 includes an RNC 105. The UTRAN is coupled to a UE 106 through a Uu interface 110. Further details regarding the UMTS architecture 100 shown in FIG. 1 can be ascertained from sections 5 and 6 of 3GPP TS 25.401 v4.0.0 (2001-03).

Figure 2:
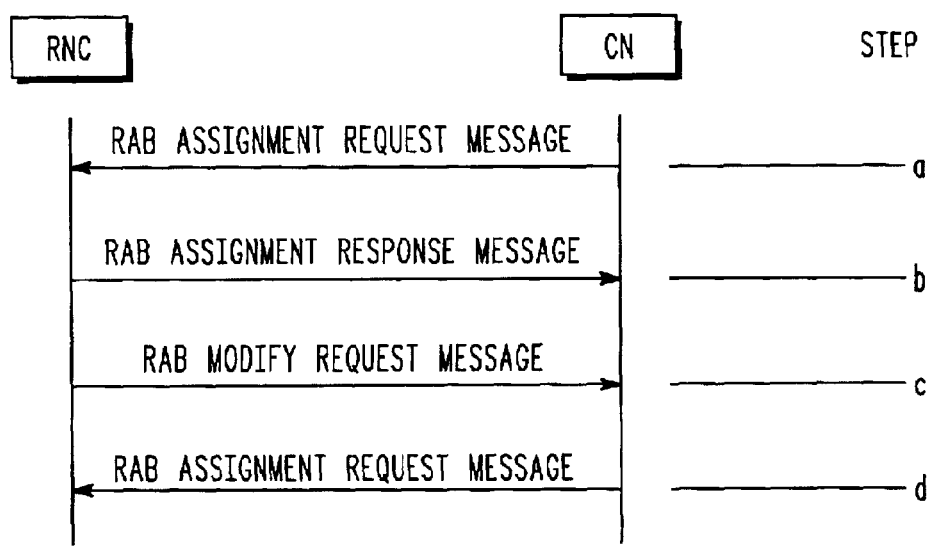
FIG. 2 is a message flow diagram that includes the preferred embodiment of the RNC initiated RAB negotiation and renegotiation/reconfiguration method of the present invention.

Referring to FIG. 2, a message flow diagram for the preferred embodiment of the method of the present invention is shown. At the establishment of a service (e.g., voice call, web surfing session, etc.) between the CN 102 and the UE 106, the CN 102 will send a RAB Assignment Request Message (RARQM) to the RNC 105. This is represented as step a in FIG. 2. The CN 102 will assign a RAB ID to the RAB associated with the service and will specify certain RAB parameter values expected for the RAB, as known in the art. However, in accordance with the present invention, the RARQM will also include a field for the CN 102 to designate RAB parameters as negotiable/renegotiable and provide a range or set of acceptable values for some or all of the parameters specified. For example, the CN 102 may specify in the RARQM a guaranteed bit rate of 16 kbps for the RAB. The CN 102 may also specify an acceptable range for the guaranteed bit rate, such as 8 kbps to 16 kbps. At step b, the RNC 105 sends a RAB Assignment Response Message (RARSM) to the CN 102. The RARSM informs the CN 102 what the RNC 105 is able to assign (i.e., which parameter values it is able to provide). For example, if the RNC 105 is unable to meet a guaranteed bit rate of 16 kbps, it may respond that it is able to meet 12 kbps, which is in the acceptable range designated by the CN 102.

After a service is established between the CN 102 and the UE 106, the RNC 105 monitors radio resources to determine if radio conditions have changed which could in turn affect the quality of the service. For example, changes in the UE's position may affect the quality of a call. In such a case, the RNC 105 may need to change one or more of the RAB parameters currently in place for the call. In accordance with the present invention, at step c in FIG. 2, the RNC 105 initiates the RAB renegotiation/reconfiguration procedure by sending a RAB Modify Request message (RMRM) to the CN 102. The RMRM includes a "RABs To Be Modified" field (or Information Element (IE)) that is used to identify the RAB ID of the RAB for which parameters need to be modified and to identify the RAB parameter values that need to be modified. For example, the voice call may have a RAB ID of "1" and the parameter value to be modified may be the guaranteed bit rate. Whereas, the RNC 105 may have been able to provide a guaranteed bit rate of 12 kbps at the establishment of the call, changed radio conditions may require the RNC 105 to lower the guaranteed bit rate to 10 kbps.

Upon receipt of the RMRM, the CN 102 will determine whether it will accommodate the request. At step d, the CN 102 may send another RARQM informing the RNC 105 whether it accepts the request to lower the bit rate to 10 kbps. Later, if radio conditions improve, the RNC 105 may send another RMRM to the CN 102 to request an increase in the guaranteed bit rate. RMRMs, RARQMs and RARSMs may continue to be exchanged between the CN 102 and the RNC 105 as long as there are parameters to be changed.

Those skilled in the art will recognize that various modifications and variations can be made in the apparatus of the present invention and in construction of this apparatus without departing from the scope or spirit of this invention. For instance, the method of the present invention has been described with reference to modifying the guaranteed bit rate parameter of a particular RAB. The method is equally applicable to any of the RAB parameters.

What is claimed is:

1. A method for radio access bearer (RAB) negotiation or renegotiation/reconfiguration comprising the steps of:

determining a need to modify at least one RAB; and sending, by a radio network controller, a RAB Modify Request message to a core network, the message specifying an identification of the at least one RAB to be modified and specifying a manner in which the at least one RAB needs to be modified.

2. The method of claim 1 further comprising the step of:

receiving a response message from the core network indicating whether the at least one RAB can be modified in the specified manner; and if the modification is acceptable, performing the modification.

3. In a Universal Mobile Telecommunication System (UMTS) comprising a Radio Network Controller (RNC), a method of performing Radio Access bearer (RAB) negotiation or renegotiation/reconfiguration comprising the steps of:

at the RNC, determining that a modification of at least one RAB needs to be made;

sending, by the RNC, a RAB Modify Request Message to a core network, the RAB Modify Request Message specifying the modification that needs to be made; and receiving a RAB Assignment Request Message from the core network.

4. The method of claim 3 wherein the RAB Modify Request Message comprises a RABs To Be Modified field which is used to identify at least one RAB parameter that needs to be modified.

5. The method of claim 4 wherein the RABs To Be Modified field further identifies a RAB ID of the RAB for which the at least one RAB parameter will be modified.

6. The method of claim 3 wherein the RAB Assignment Request Message specifies whether the modification is acceptable to the core network.

7. In a communication system comprising a Radio Network Controller (RNC), a method of performing Radio Access bearer (RAB) configuration comprising the steps of:

receiving a RAB Assignment Request Message containing a requested parameter value for each of a plurality of RAB parameters for a particular RAB, wherein for each of the plurality of RAB parameters, a range or set of acceptable values is provided;

at the RNC, determining whether each of the requested parameter values can be accommodated; and if the RNC cannot accommodate one of the requested parameter values for one of the plurality of RAB parameters, sending a RAB Assignment Response Message to the CN specifying a parameter value in the range of acceptable values for the one of the plurality of RAB parameters.

* * * * *